United States Patent [19]

Garcia et al.

[11] Patent Number: 5,802,166
[45] Date of Patent: Sep. 1, 1998

[54] DUAL SIGNAL TRIGGERED MESSAGE WAITING NOTIFICATION SYSTEM FOR INDICATING STORAGE OF DIFFERENT TYPES OF MESSAGES AWAITING RETRIEVAL

[75] Inventors: Rosanna Garcia; Paul Rummel, both of Lynn, Mass.

[73] Assignee: SNI Innovation, Inc., Waltham, Mass.

[21] Appl. No.: 347,581

[22] Filed: Nov. 30, 1994

[51] Int. Cl.⁶ .................................................. H04M 1/64
[52] U.S. Cl. ........................ 379/372; 379/67; 379/89; 379/201; 379/252; 379/396
[58] Field of Search ........................ 379/63, 94, 100, 379/88, 89, 396, 201, 142, 376, 96, 372, 263, 214, 211, 212, 67, 252

[56] References Cited

U.S. PATENT DOCUMENTS

| | | | |
|---|---|---|---|
| 3,532,832 | 10/1970 | Hestad et al. | 379/263 |
| 3,906,168 | 9/1975 | McEowen | 379/162 |
| 4,140,882 | 2/1979 | Regan et al. | 379/201 |
| 4,506,115 | 3/1985 | Schmitt | 379/376 |
| 4,551,581 | 11/1985 | Doughty | 379/94 |
| 4,564,729 | 1/1986 | Mills | 379/396 |
| 4,582,959 | 4/1986 | Myslinski et al. | 379/88 |
| 4,648,109 | 3/1987 | Boeckmann | 379/376 |
| 4,837,798 | 6/1989 | Cohen et al. | 379/94 |
| 4,853,952 | 8/1989 | Jachmann et al. | 379/88 |
| 5,018,191 | 5/1991 | Catron et al. | 379/94 |
| 5,138,653 | 8/1992 | Le Clereq | 379/96 |
| 5,193,110 | 3/1993 | Jones et al. | 379/88 |
| 5,208,850 | 5/1993 | Kino | 379/88 |
| 5,228,026 | 7/1993 | Albrow et al. | 379/63 |
| 5,263,084 | 11/1993 | Chaput et al. | 379/142 |
| 5,327,493 | 7/1994 | Richmond et al. | 379/372 |
| 5,333,266 | 7/1994 | Boaz et al. | 395/200 |
| 5,341,411 | 8/1994 | Hashimoto | 379/142 |
| 5,349,638 | 9/1994 | Pitroda et al. | 379/142 |
| 5,377,260 | 12/1994 | Long | 379/142 |

*Primary Examiner*—Krista Zele
*Assistant Examiner*—Scott Wolinsky
*Attorney, Agent, or Firm*—Robert T. Dunn, Atty

[57] ABSTRACT

A message waiting notification system comprising a telephone provider's off premise central switching office connected to a Dual Signal Triggered Message Waiting Indicator (DSTMWI) circuit via a telephone line is disclosed. The central switching office transmits predetermined asynchronous Frequency Shift Keying (FSK) signals and/or audible tones indicating different types of electronically stored communication messages awaiting retrieval, such as voice mail, E-mail, fax mail and video mail. Responsive to receiving the FSK signals and/or audible tones from the central switching office via the telephone line, the DSTMWI circuit provides visual notification of any combination of different types of the electronically stored communication messages.

6 Claims, 9 Drawing Sheets

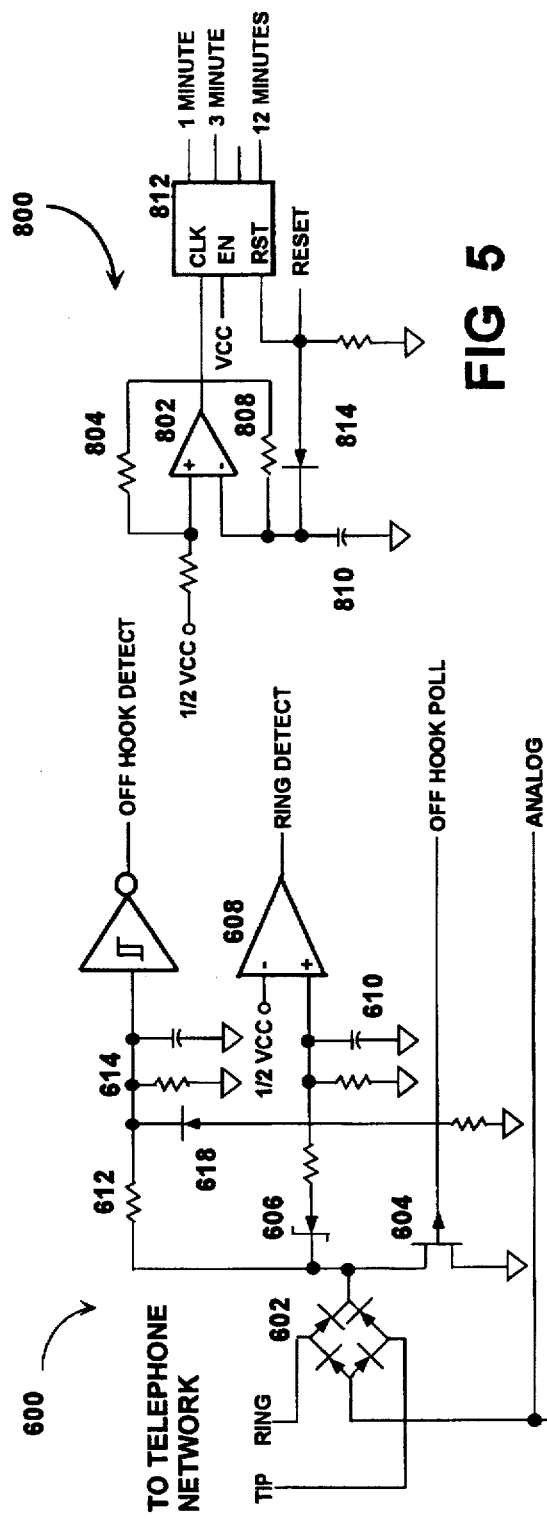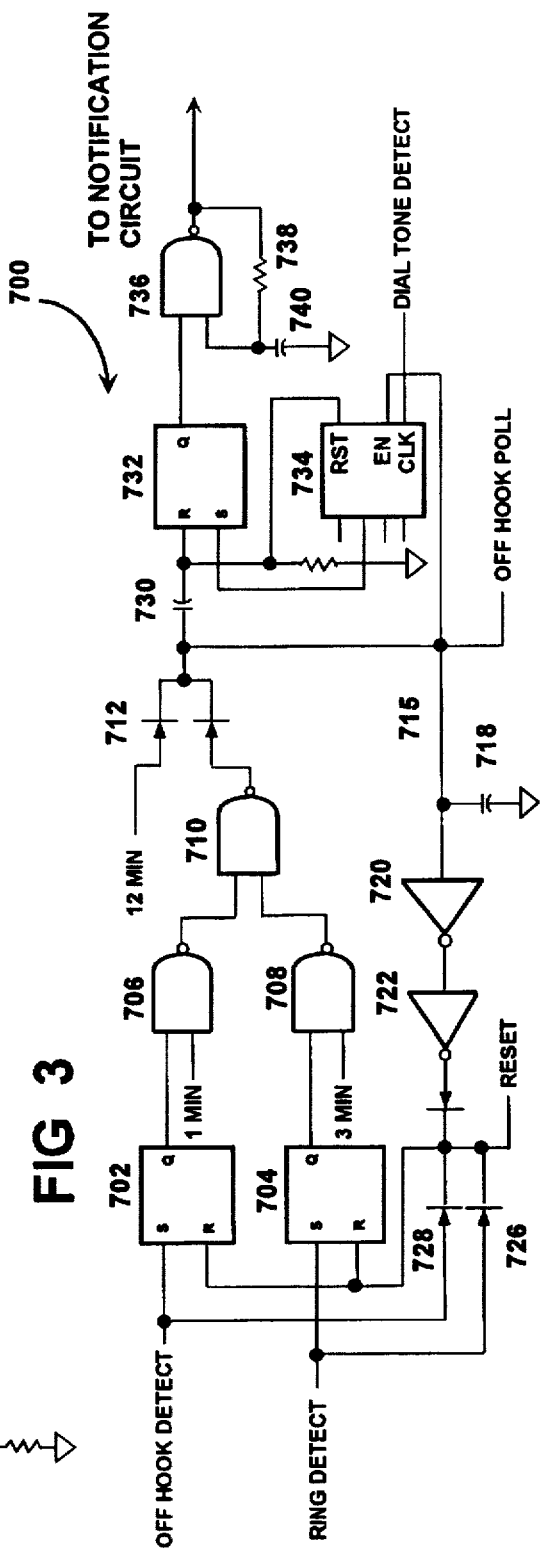

DUAL SIGNAL TRIGGERED MESSAGE WAITING NOTIFICATION SYSTEM FOR INDICATING STORAGE OF DIFFERENT TYPES OF MESSAGES AWAITING RETRIEVAL

BACKGROUND

1. Field of Invention

This present invention relates to a unique Message Waiting Indicator (MWI) circuit and, more particularly to such an indicator circuit that is triggered by either an asynchronous Frequency Shift Keying (FSK) digital word/words and/or an audible tone signal as sent via a telephone line from a telephone service provider's off premise central switching office.

2. Description of Prior Art

With the development of the digital storage of voice messages in a computer system for future listening, known as Voice Mail, various arrangements have been developed for notifying Voice Mail users of stored messages awaiting retrieval. Presently, to alert a subscriber that a message is waiting, a light at a telephone is triggered via a signal to indicate the presence of a message. Several methods are used for illuminating such a lamp.

Prior art has focused on using a message waiting indication (MWI) voltage to trigger a lamp for analog telephones such as that described in U.S. Pat. No. 3,532,832 issued to, Hestad et al on Oct. 6, 1970 and in U.S. Pat. No. 4,648,109 issued to Boeckmann on Mar. 3, 1987. Recent advancements have allowed the signal to be sent via an FSK signal as referenced in U.S. patent application Ser. No. 08/221,863 of the applicants herein, filed Mar. 31, 1994 (abandoned), and through the detection of a call progress tone signal.

U.S. Pat. No. 5,327,493 issued to Richmond et al on Jul. 5, 1994 describes a device and method for detecting call progress tones which device then causes other actions, mainly the illumination of an indicator light on equipment connected to a telephone line. This invented device automatically and periodically goes "off-hook", listens for a dial tone and determines whether it is a special dial tone. With the presence of the tone, the light is illuminated.

This device, as presented by Richmond et al, fails to address the problem of central office switch overload by repetitive "off-hook" polling for the absence or presence of the call progress tone. Our invention will provide a means of minimizing this concern by allowing the automatic off hook detection for an audible tone to be turned off.

Previous art also fails to address the need for one device to provide calling party Caller Identification (Caller ID) capabilities and Voice Mail message waiting notification using broken dial tone detection circuitry. Previous art requires the end user of Voice Mail using broken dial tone detection and Caller ID services to install two pieces of equipment on their telephone line: one unit to receive the Caller ID number and another to receive the message waiting notification.

To meet the widely perceived need for an indication that a message is waiting retrieval, prior art has addressed methods of triggering an indicator light with separate and distinct pieces of equipment dependent upon the signal delivered. However, "broken dialtone", i.e., stutter dialtone, FSK signaling, MWI voltages, and other special electronic signals can be delivered by the same central office telephone switch or Private Branch Exchange (PBX) equipment. These prior arts fail to allow a telephone switching equipment to provide varying types or more than one type of signal to trigger a visual indication on a single device connected to the telephone line. With prior art the signal delivered becomes dependent on the telephone system and the type of listening device attached to the telephone.

Additionally, each of these prior arts are limited to the notification of one type of stored message, usually a voice mail message. With the even more recent development of the computer capabilities to store voice mail messages, fax mail messages, electronic mail messages and video mail in one database, each of these mediums will require the notification of the user of the type of mail stored. The different types of signals could be used to indicate the different types of messages that can be stored. Prior art has not addressed this concern.

Prior Caller ID art does not address the need to have message waiting notification in combination with the calling party's number display screen. Any type of incoming notification signal may be combined with the Caller ID technology to provide an economical and practical solution over two pieces of equipment.

OBJECTS AND ADVANTAGES

Accordingly, an object of the invention is to provide new and improved Dual Signal Triggered Message Waiting Indicator (DSTMWI) systems. Several objects and advantages of our invention are:

(a) to provide an intelligent circuitry that utilizes either asynchronous FSK encoded digital words/word and/or call progress tones to turn on one or more lamps to notify a user of the presence of one or more different types of electronically stored messages; any type.

(b) a device using the intelligent circuit of (a) that utilizes a switch to disable the off-hook polling of call progress tones circuitry to minimize central office switch overload;

(c) a device using the intelligent circuit of (a) that will turn on a lamp in response to detecting an audible tone, such as DTMF tones, as sent via a telephone line; and (d) an enclosure to house the circuitry of (b) or (c) that will provide substantially increased visibility due to its design allowing a lamp manufacture's viewinq angle rating to be increased.

Further objects and advantages of my invention will become apparent from a consideration of the drawings and ensuing descriptions.

SUMMARY OF THE INVENTION

One aspect of the disclosed invention is the conversion of a telephone switch initiated signal to visual indications. An embodiment of this invention illuminates a visual indication light on a device connected to the customer's telephone line when either an auditory message waiting indication in the form of a non-standard dial tone or a FSK signal is placed on the customer's line by the central office. This embodiment of the invention overcomes the short comings of the current message waiting indication systems previously described. It is far less expensive; the message waiting indication detector and indicator light can be added to the customer's telephone equipment without replacing existing equipment; Additionally, neither the voice mail user nor the telephone service provider needs to distinguish what type of signal to send to a voice mail user. This minimizes confusion in the marketplace of what type of unit is required by the end user.

If an auditory message waiting indication is delivered this will not interfere with the other signals, and the auditory indication can still be heard at all extension telephones. If both an auditory indication and a FSK signal are delivered, the customer's telephone can be "off-hook" for any number of hours and it can deliver the notification signal as the broken dial tone is not lost after a set amount of time. (FSK signaling resets after 2½ hours.)

In other applications, the signaling can take the form of DTMF (dual tone multi frequency) tones instead of a distinctive non-standard dial tone. The ring or off hook of the telephone acts as the initiation clock to notify the device to go off hook to listen for the DTMF tone. The signaling method may take the form of any type of audible tones transmittable over the telephone line. The inventions detection circuitry can be programed to recognize these designated tones to trigger on/off the indicator light.

Another aspect of the invention is a novel method of using more than one type of signal or different forms of the same signal (ie. different DTMF tones) to indicate different types of electronically stored messages. A FSK signal could indicate voice mail messages stored, a DTMF signal indicates a fax mail message stored, and a call progress tone a stored e-mail message.

An alternative embodiment allows for a three position or toggle switch to turn off the broken dial tone detection function when it is not needed. Central office switches can be adversely affected with switch overload by devices that automatically go off-hook to listen for a call progress tone as presented in prior art. If FSK signaling is used in a territory where broken dial tone detection is undesirable, this feature can be disabled with the switch. It is also possible to temporarily disable the broken dial tone detection if the voice mail service is temporarily discontinued. Accordingly the invention can be configured to take various positions as a user may want to disable E-mail storage but not voice mail storage notification. Any combination of alternatives can be envisioned.

Another embodiment allows user of Caller ID service to also have call progress tone detection for Voice Mail services without requiring an additional piece of equipment. Again the broken dial tone detection could be turned off without turning off the Caller ID capabilities.

Although the description above contains many specifications, these should not be construed as limiting the scope of the invention but merely providing illustration of some of the presently preferred embodiments of this invention.

BRIEF DESCRIPTION OF DRAWINGS

In the drawings, closely related figures have the same number but different alphabetic suffixes.

FIG. 3 shows the broken dial-tone line interface circuitry.

FIG. 4 shows the broken dial-tone logic circuitry.

FIG. 5 shows the broken dial-tone timing circuitry.

DESCRIPTION OF PREFERRED EMBODIMENT

Figure 1:
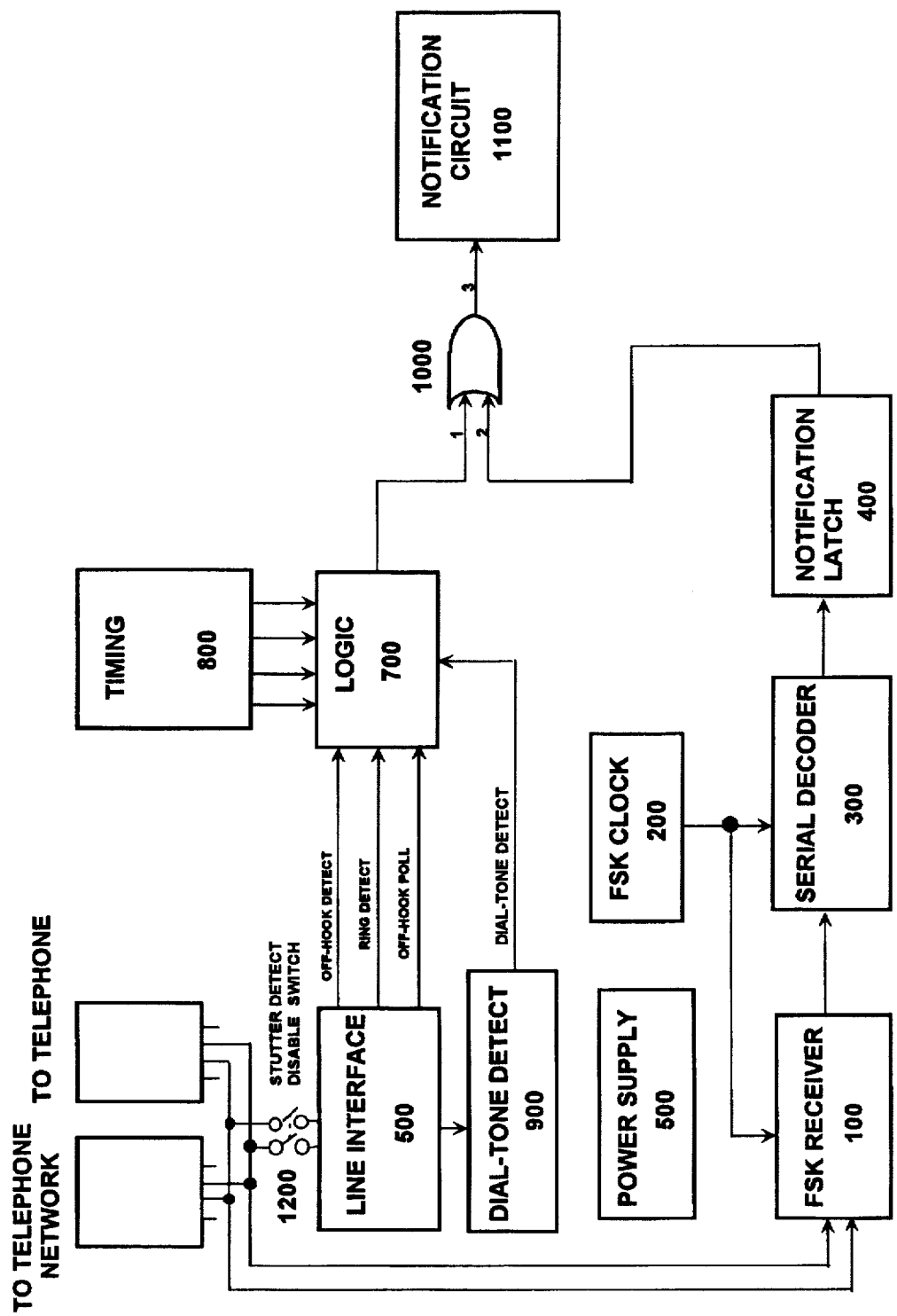
FIG. 1 shows the DSTMWI block diagram.

FIG. 1 is a block diagram of the DSTMWI. FSK receiver 100, clock 200, serial decoder 300, and notification latch 400 describe the FSK portion of the DSTMWI. Line interface 600, logic circuit 700, timing circuit 800, and tone detect circuit 900 describe the broken dial-tone detect portion of the DSTMWI. OR gate 1000 sums the two outputs of the FSK and stutter MWI detectors to give a combined MWI signal to notification means 1100. Power supply 500 provides the necessary voltages for all portions of the circuit. Stutter tone detect disable switch 1200 disconnects the telephone line to the stutter portion of the DSTMWI. This gives the option of not having the unit poll the telephone line when FSK MWI is available, thus reducing network loading.

Figure 2:
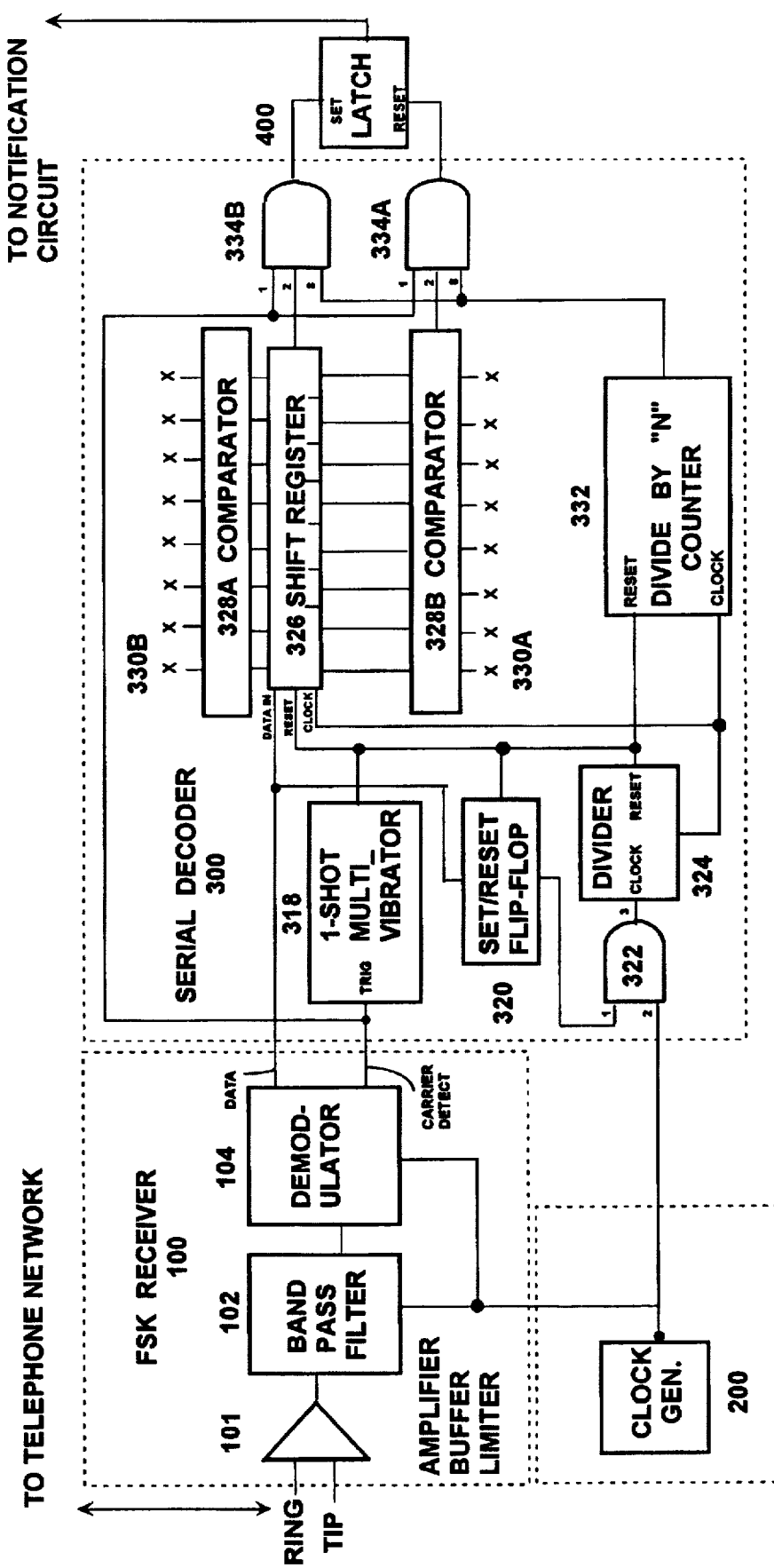
FIG. 2 shows the FSK portion of the DSTMWI.

As shown in FIG. 2, the front end of the FSK portion consists of standard circuitry of any form of FSK receiver 100 typically comprising; input amplifier/buffer /limiter circuit 101 followed by bandpass filter 102, followed by demodulator 104. The outputs of this circuit are a carrier detect and a data output. The carrier detect output goes high whenever an FSK 'space' or 'mark' tone is present on the telephone line. The data output logic level is dependant on whether the FSK tone is a 'space' or 'mark'. This output gives the serial digital data as represented as FSK tones on the telephone line. If the tone is a 'mark', the data output is a high or logical 1. If the tone is a 'space' then the data output is a low or logical 0.

The FSK receiver 100 outputs drive the serial decoder circuit 300 that compares an incoming FSK data stream to predetermined digital codes that represent the need to turn ON or OFF any of the notifier devices. The first eight bits of the incoming FSK data stream are compared to two different predetermined key data word 330A and 330B. If there is a match, then either comparator 328A or 328B' S output will be high, turning 'ON' or 'OFF' the notification means 1100 via OR gate 1000. Thus, FSK data code determines the status of any number of indicators.

A high on demodulator 104' s carrier detect output resets shift register 326 and set/reset flip-flop 320 through 1-shot multivibrator 318. Set/reset flip-flop 320 holds off clock 200 with AND gate 322 until the first 'start' data bit appears on data line from demodulator 104. This 'start' bit sets set/reset flip-flop 320 output high, which puts clock 200 output into the clock input or divider 324. This divider is chosen to have an output that is timed appropriately for the timing baud rate of the FSK protocol used. The output of divider 324 goes to shift register 326 clock input, effectively 'clocking' in the incoming data stream. The 'N' of divide by 'N' counter 332 is chosen based upon the length of the data stream expected to contain the information that turn ON or OFF the FSK message waiting notifiers. Shift register 326, comparators 328A and 328B, key data words 330A and 330B, and divide by 'N' counter 332 can be of any length desired.

More than two comparators (328A & 328B) and key data words (330A & 330B) can be connected and compared to shift register 326 if multiple notifiers are desired. Multiple notifiers could be used to indicate the status of stored voice messages, FAX messages, E-mail, video mail, etc. Multiple words could be used or just a single eight bit word read into shift register 326 could determine the status of eight different notifiers.

The output of AND gate 334A or 334B will go high when the length of the data stream is reached (as determined by the divide by 'N' counter 332), and comparator 328A or 328B output is high indicating a match between key data word 330A or 330B to the contents of shift register 326, and the carrier detect input is still high indicating FSK tones are being received and data is likely to be valid.

Since notifier status outputs from AND gates 334A or 334B will only be high for a short period of time, set/reset notification latch 400 is needed to keep the notifier ON or OFF until another FSK signalled command is sent from the off premise central switching office. The output of notification latch 400 provides the input logic to notification means 1100.

FIG. 3 shows the circuit comprising the line interface 600 of the broken dial-tone portion of the DSTMWI. Bridge 602 ensures proper polarity for off-hook FET 604. Ring detection is accomplished by tip/ring voltage rising above zener 606 voltage making output of comparator op-amp 608 go high. Capacitor 610 provides filtering to make the ring detect output a constant DC level. Off-hook detect is accomplished by detecting a low tip-ring voltage through resistor divider 612 and 614, driving schmidt trigger inverting buffer 616 high. Diode 618 ensures that off hook detect output does not go high when off-hook FET 604 is enabled. Analog output for tone detect is accomplished by measuring voltage across off-hook load resistor 620.

FIG. 4 shows the logic circuitry 700 of the broken dial-tone portion of the DSTMWI. If an off-hook condition occurs, latch 702 is set. If a ring occurs, latch 704 is set. Either occurrence will reset timing circuit 800 via diodes 726 and 728. If the one minute signal from timer 800 goes high, and an off-hook condition has occurred as indicated by set latch 702, then gate 706 output goes low. If the three minute signal from timer 800 goes high, and a ring has occurred as indicated by set latch 704, then gate 708 output goes low. If either gate 706 or 708 gate goes low, then output of gate 710 goes high, turning on off-hook FET 604 of line interface circuit. If neither off-hook or a ring has occurred, the off-hook output signal will go high when the 12 minute signal from timer 800 goes high, via diode 712. Any time the off-hook signal goes high, a three second reset delay is accomplished via resistor 716, capacitor 718, and schmidt trigger inverters 720 and 722. This part of the circuit performs the logic circuit and timing circuit reset signal after the poll for broken dial-tone (off-hook is high), has occurred for three seconds. The beginning of the poll resets notifier enable latch 732 and stutter dial tone counter 734 via capacitor 730. When four stutters have been clocked into counter 734 via the dial-tone detect circuit 900, then the Q2 output of counter 734 goes high, setting notifier latch 732. Set notifier latch 732 enables notifier strobe schmidt trigger gate 736 providing an on/off pattern of notification. Resistor 738 and capacitor 740 provide the timing for the on/off cycling.

FIG. 5 shows the timing circuit 800 of the broken dial-tone portion of the DSTMWI. Op-amp 802 provides the clock circuit. Positive feedback is obtained through resistors 804 and 806, while clock timing is obtained through resistor 808 and capacitor 810. The output of the clock op-amp 802 drives the clock input of counter 812, providing one minute, three minute and 12 minute output signals to drive logic circuit 700. Clock reset is accomplished by forcing the voltage on timing capacitor 810 high through isolation diode 814.

Figure 6:
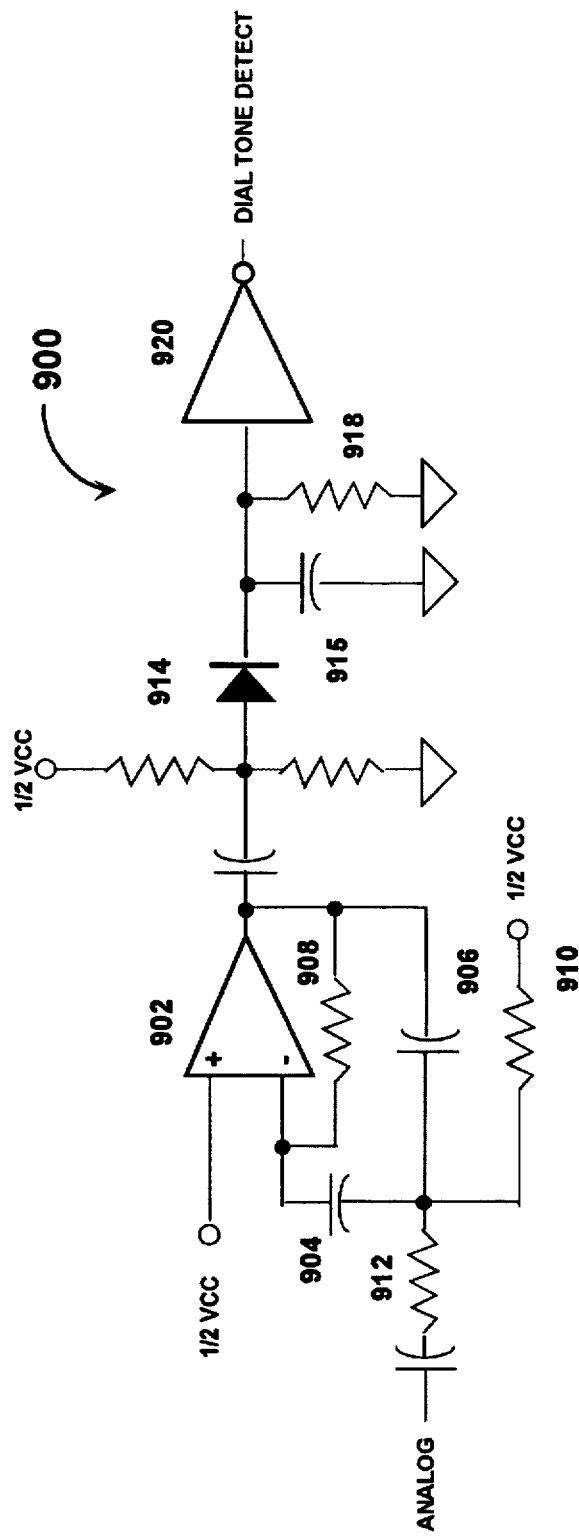
FIG. 6 shows the broken dial-tone detect circuitry.

FIG. 6 shows the tone detect circuit 900 of the broken dial-tone portion of the DSTMWI. Band-pass amplification is accomplished with op-amp 902 and bandpass/amplifier capacitors 904 and 906, and resistors 908, 910, and 912. The frequency can be set to any of the individual frequencies that make up a dial tone. Using a bandpass filter helps to eliminate any false MWI triggering that might occur when the unit goes off-hook and encounters excessive noise on the telephone line. An averaging circuit comprised of diode 914, capacitor 916 and resistor 918 creates a DC level when a constant dial-tone is encountered and a varying level when a stuttered dial-tone is encountered. Schmidt trigger inverter 920 cleans up this possible varying signal to provide clean transitions for the stutter dial-tone counter (734) of logic circuit 700.

Figure 7:
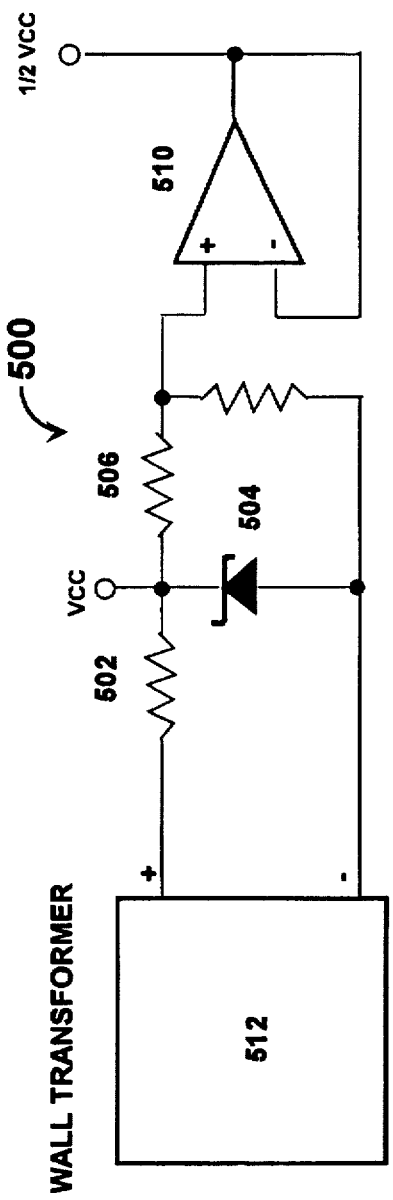
FIG. 7 shows the DSTMWI power supply circuitry.

FIG. 7 shows a possible power supply circuit 500 to provide all required voltages of the DSTMWI. Any form of input power could be used to supply DSTMWI power. For this example, a 12 v wall transformer 512 was used. Resistor 502 and zener diode 504 perform the task of voltage regulation to a level below wall transformer 512 output voltage. This removes any possible ripple. Resistors 506 and 508 form a voltage divider of half of the VCC voltage. Op-amp 510 provides a high current buffer for the ½ VCC which is used as a reference in various portions of the DSTMWI circuitry as previously described.

Figure 8:
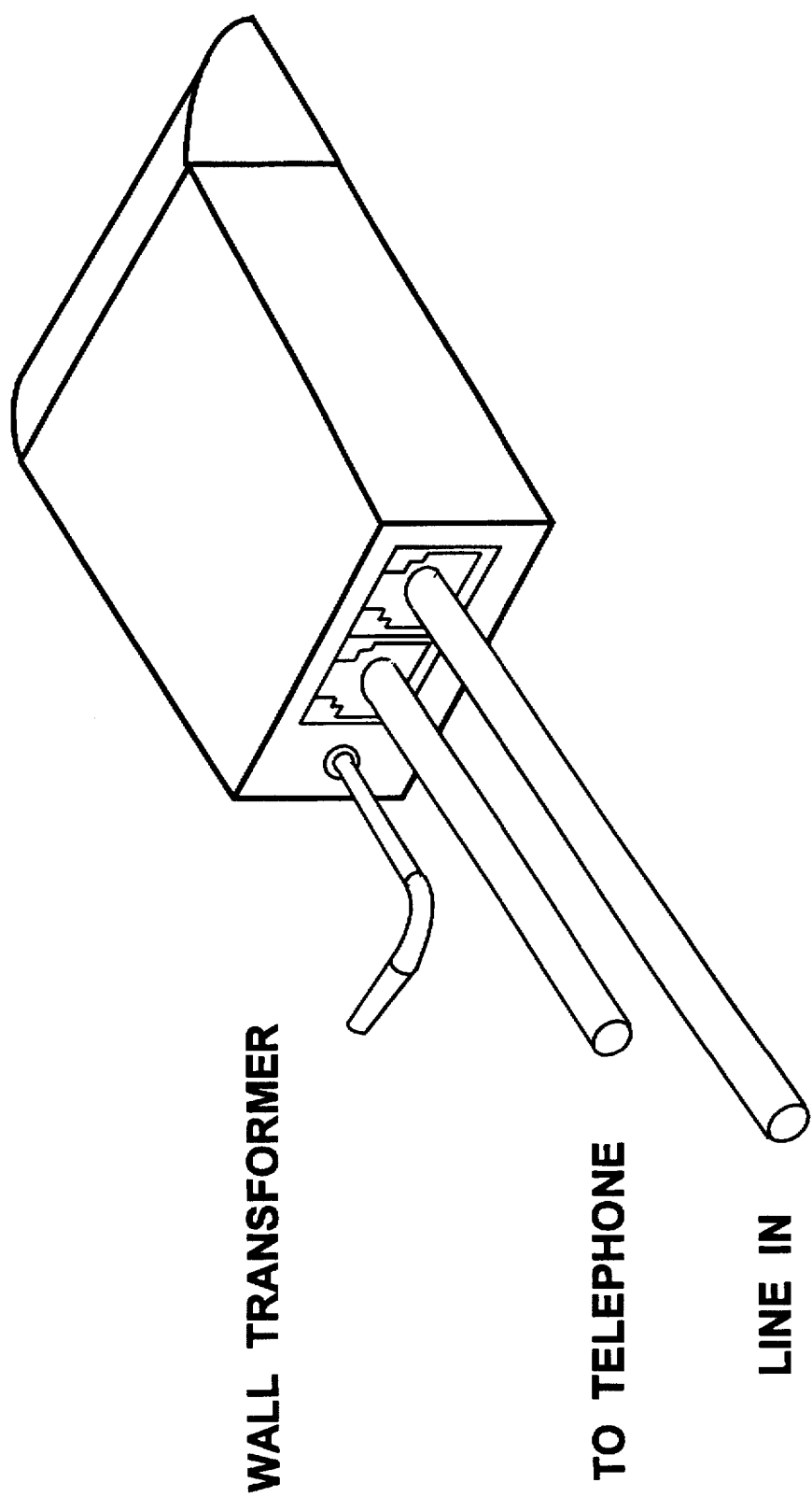
FIG. 8 shows a typical DSTMWI module and connection.
Figure 9A:
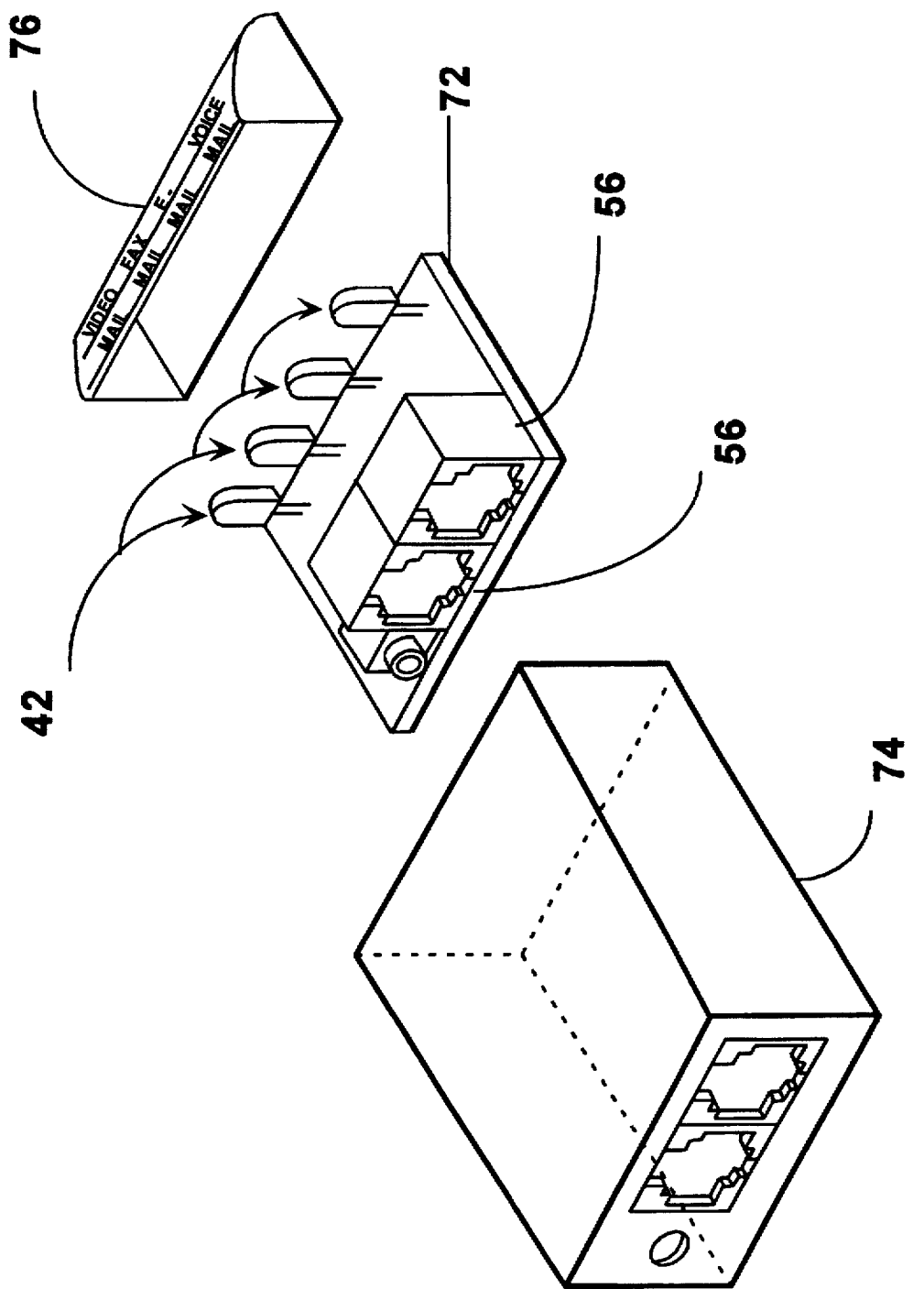
FIGS. 9A and 9B show the module with various notification means.
Figure 9B:
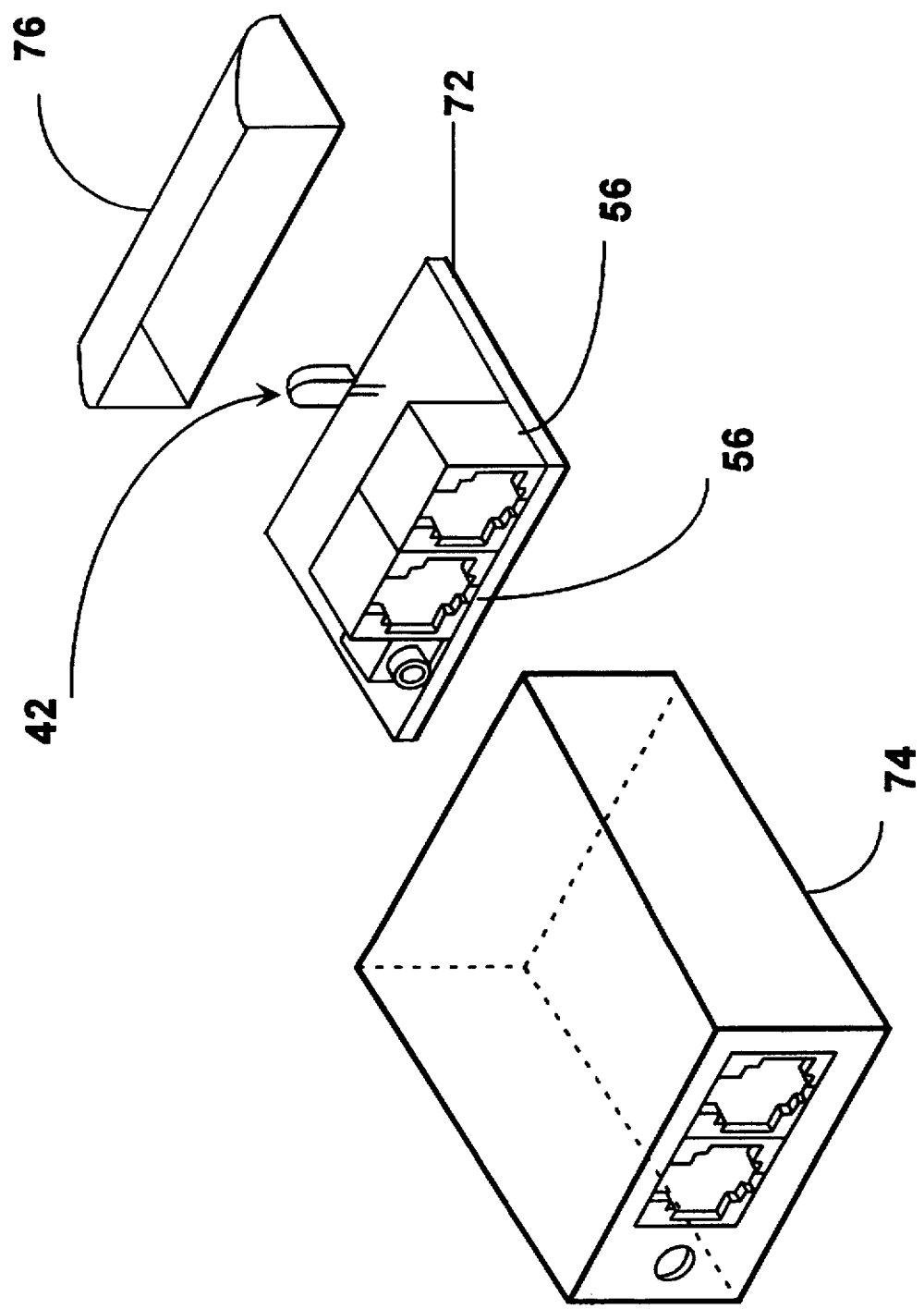
Figure 10:
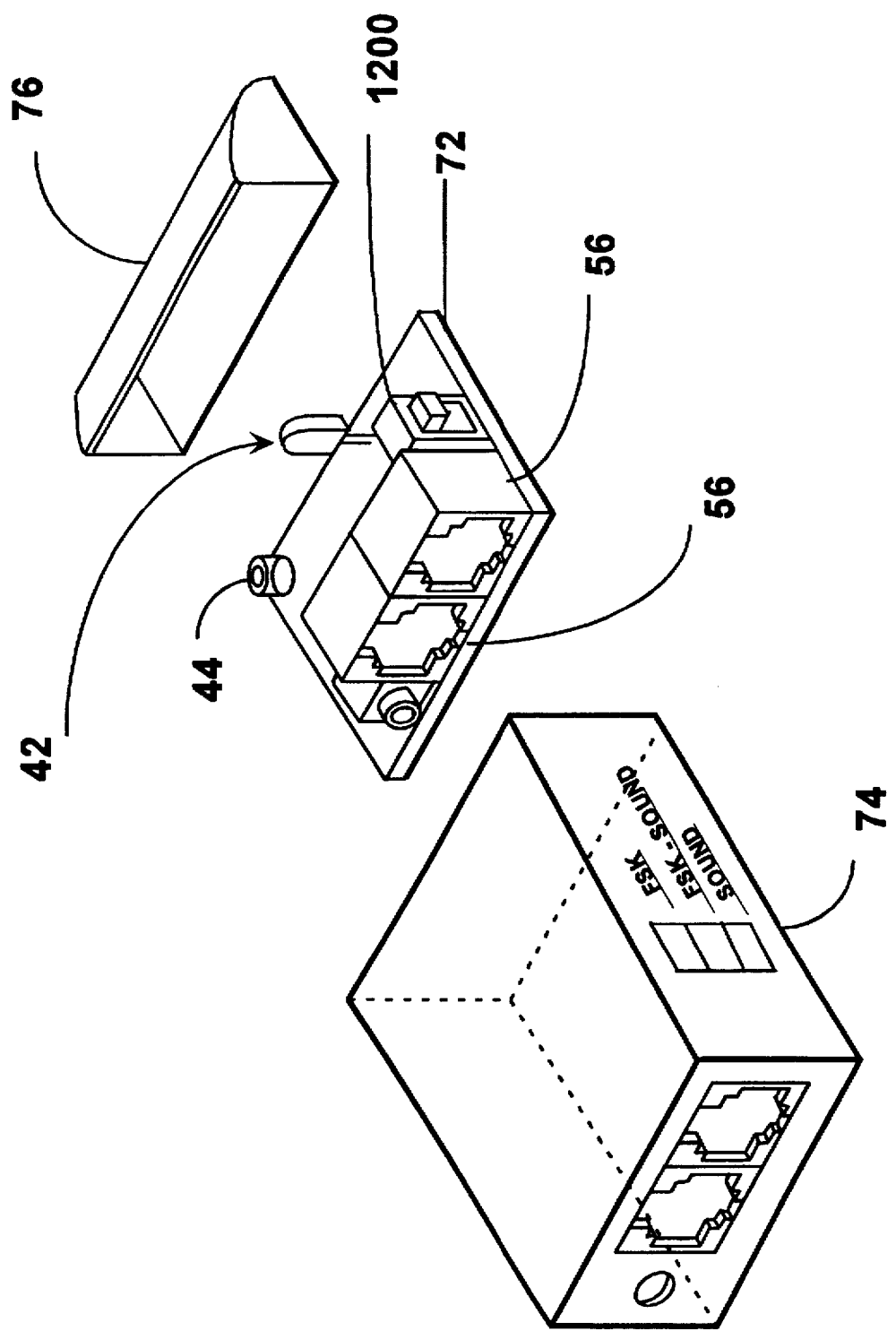
FIG. 10 shows the optional audible tone detection on/off switch.
Figure 11:
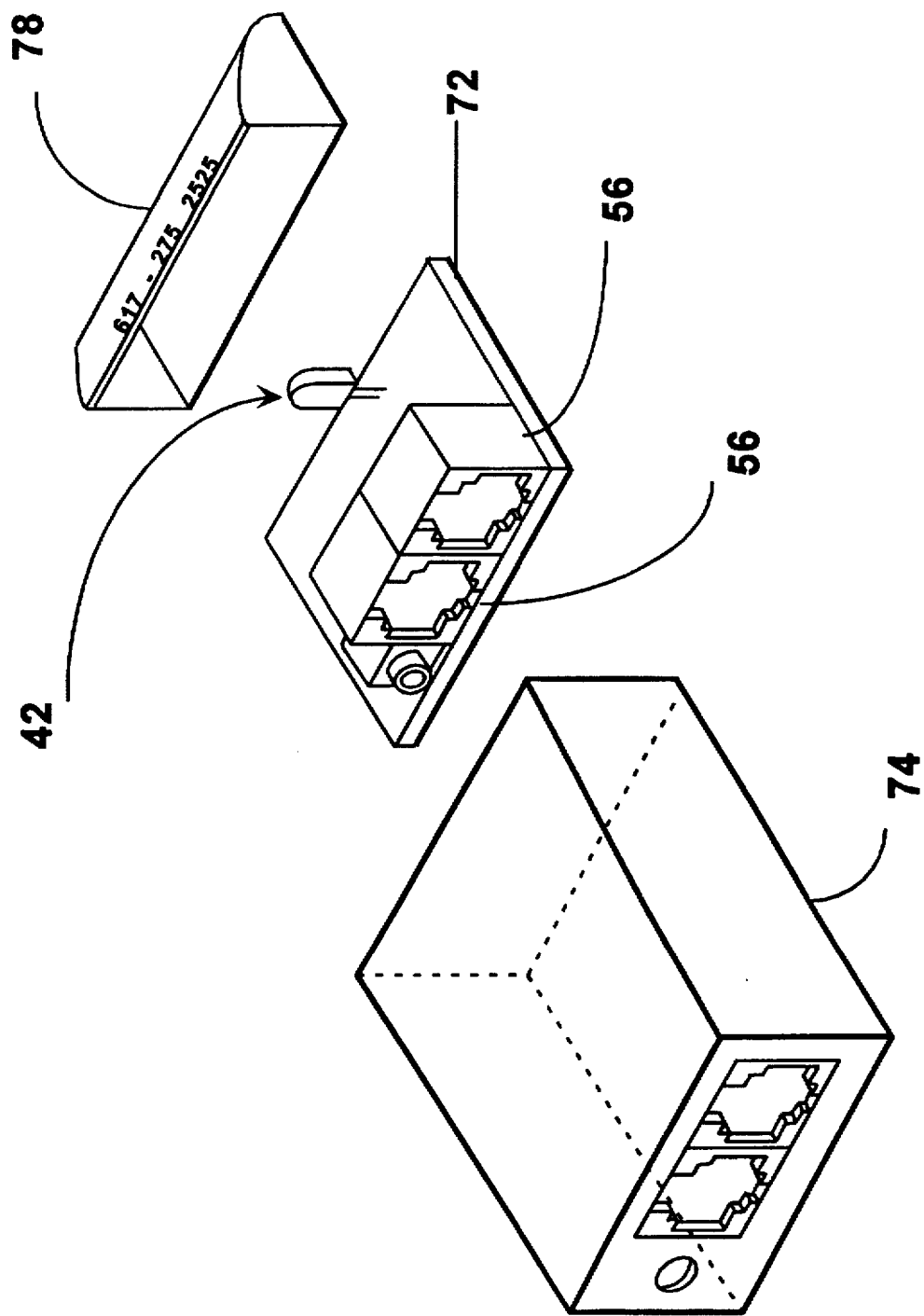
FIG. 11 shows a combination Caller ID/DSTMWI module.

FIGS. 8, 9A, 9B and 10 show the circuitry described above in an, enclosure. A typical embodiment of the combination of the enclosure and circuitry is illustrated in FIG. 9A. Additional embodiments are shown in FIGS. 9B, 10 and 11.

FIG. 8 shows the message waiting indicator unit in a typical connection set up for installation to a telephone line. FIG. 9A shows the unit having the capability for indication of different types of messages stored with the front enclosure 76 labeled with predetermined locations to identify the lamp 42 corresponding to a particular type of message stored. The visual indicator could also be different colored lamps. FIG. 9B shows the unit with its front enclosure 76 and back enclosure 74 which houses the circuitry 72, The unit connects to the tip and ring line-in through the telephone modular jacks 56. The visual indicator 42 sits within the housing illuminating the entire front enclosure. FIG. 10 further illustrates the stutter disable switch 1200 which allows switching between having notification from the FSK signal, the audible signal or both types of signals together. An audible indicator 44 is also shown sitting inside the housing. FIG. 11 shows an embodiment where the Caller ID viewing screen 78 is combined with the DSTMWI device previously described.

The circuitry housed in the enclosure, as previously described, connects a standard tip and ring line to a telephone switch via the telephone modular jacks. The asynchronous FSK signal and/or an audible tone when sent via the telephone line to the message waiting circuitry triggers the notification devices of the unit. FIGS. 9A, 9B and 10 show the preferred equipment with the visual indicator(s) 42. Select switch 1200 allows the user to switch between FSK signaling only, audible tone detection only, or the combination of both used together.

The message waiting indicator unit can be used to indicate the presence of different types of stored messages as shown in FIG. 9A. As previously described, connecting the unit to the telephone line via the telephone modular jack allows a designated signal as provided by the telephone switch to trigger the lamps 42 housed in the enclosure. The user will know the type of message, such as voice mail, E-mail, etc., that has been stored and is awaiting retrieval. Any combination of the lamps can be triggered on or off dependent upon the signal received. Multi-colored lamps or different colored lamps can also be used to identify the type of message stored.

A combination Caller ID and dual signal triggered message waiting indicator is embodied in FIG. 11. A user of Caller ID service and Voice Mail services can use the same unit to receives the calling party's phone number and message waiting notification through audible tone detection.

We claim:

1. A message waiting notification system comprising:

a telephone provider's off premise central switching office for transmitting predetermined asynchronous Frequency Shift Keying (FSK) signals and/or audible tones over a telephone line indicating different types of electronically stored communication messages awaiting retrieval, said different message types including voice mail, E-mail, fax mail and video mail; and a Dual Signal Triggered Message Waiting Indicator (DSTMWI) circuit connected to said central switching office via said telephone line, said DSTMWI circuit comprising notification means for providing visual notification of any combination of said different message types in response to receiving FSK signals and/or audible tones indicative of said combination from said central switching office over said telephone line.

2. The DSTMWI circuit of claim 1 further including;

(a) an FSK receiver;

(b) a serial decoder used to compare an incoming data stream to a pre-determined data stream as received from said FSK receiver;

(c) a ring detect circuit;

(d) an off-hook detection circuit;

(e) a timing circuit;

(f) a broken dial tone detection circuit; and (g) an output device driver to enable and disable said notification means.

3. The DSTMWI circuit of claim 1 further including means for switching between:

(a) triggering said notification means by detecting only FSK encoded digital words, (b) triggering said notification means by detecting only broken dial tones, and (c) triggering said notification means by detecting one of said FSK encoded digital words and broken dial tones.

4. The DSTMWI circuit of claim 1 wherein said notification means includes lamps to identify and indicate the presence of aid stored communication messages.

5. The DSTMWI circuit of claim 1 wherein said notification means includes lamps that are labeled to identify and indicate the presence or said stored communication messages.

6. The DSTMWI circuit of claim 1 wherein said notification means includes light emitting diodes to identify and indicate the presence of said stored communication messages.

* * * * *